United States Patent

Van Auken et al.

[11] 4,092,988
[45] June 6, 1978

[54] SMOKING TOBACCO COMPOSITIONS

[75] Inventors: Thomas V. Van Auken, Richmond; Harvey J. Grubbs, Mechanicsville; William R. Johnson, Jr., Richmond, all of Va.

[73] Assignee: Philip Morris Incorporated, New York, N.Y.

[21] Appl. No.: 739,291

[22] Filed: Nov. 5, 1976

[51] Int. Cl.$^2$ .............................................. A24B 3/12
[52] U.S. Cl. .................................. 131/17 R; 131/144
[58] Field of Search .................. 131/2, 17, 15, 144; 260/77.5, 78.3 UA

[56] References Cited

U.S. PATENT DOCUMENTS

| | | | |
|---|---|---|---|
| 2,595,214 | 5/1952 | Adelson et al. | 263/78.3 UA |
| 3,312,226 | 4/1967 | Bavley et al. | 131/17 R |
| 3,419,543 | 12/1968 | Mold et al. | 131/17 R |
| 3,589,372 | 6/1971 | Theimer | 131/17 R |

FOREIGN PATENT DOCUMENTS 610,590  11/1960  Belgium ..................... 263/78 UA Primary Examiner—Robert W. Michell
Assistant Examiner—V. Millin
Attorney, Agent, or Firm—Depaoli & O'Brien

[57] ABSTRACT

This invention provides tobacco compositions which contain a flavorant-release oligomeric and polymeric derivative corresponding to the structural formula:

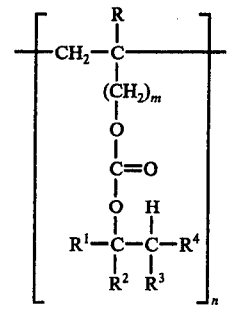

wherein R is a member selected from the group consisting of hydrogen and aliphatic, alicyclic and aromatic hydrocarbon radicals containing between 1 and about 10 carbon atoms, with the proviso that R is hydrogen when $m$ is zero; $R^1$, $R^2$, $R^3$ and $R^4$ are members selected from the group consisting of hydrogen and aliphatic, alicyclic and aromatic hydrocarbon radicals; and $m$ and $n$ are integers.

8 Claims, No Drawings

SMOKING TOBACCO COMPOSITIONS

BACKGROUND OF THE INVENTION

The incorporation of flavorants in tobacco products is an important development in the tobacco industry due to the lowered aromaticity of the available tobacco and to the increased preference of some smokers for filter cigarettes. The addition of certain desirable flavorants to tobacco is limited by their volatility which causes them to be lost or diminished in quantity during processing and storage of the tobacco product. This problem is even more acute for filter cigarettes containing active adsorbent, such as charcoal, in the filters. During the processing and storage of this type of product, volatile flavorants migrate from the tobacco and are irreversibly bound by the active adsorbent, thereby depleting the flavorant in the product and possibly altering the effectiveness of the active adsorbent in its selective removal of undesirable smoke components.

A variety of flavorants have been developed and proposed for incorporation into tobacco products. Illustrative of such tobacco flavorants are those described in U.S. Pat. Nos. 3,580,259; 3,625,224; 3,722,516; 3,750,674; 3,879,425; 3,881,025; 3,884,247; 3,890,981; 3,903,900; 3,914,451; 3,915,175; 3,920,027; 3,924,644; 3,937,228; 3,943,943; 3,586,387; and the like. The tobacco flavorants include compounds such as succinic anhydride; dihydroxyacetone; substituted pyridines; cinnamic derivatives; isovaleric acid; 6-methylhepta-3,5-dien-2-one; 2-butyl-2-butenal; 1,3-cyclohexadiene; alpha-pyrones; substituted butyrolactones; pyrazines and thiazolidines; and the like.

U.S. Pat. No. 3,139,888 suggests the use of isoprenoid alcohols to impart desirable flavor to tobacco. U.S. Pat. No. 3,589,372 recommends the incorporation of a polyisoprenoid hydrocarbon into tobacco products as a flavor enhancer.

The high degree of volatility and ease of sublimation of flavorant additives in tobacco products have presented problems in the manufacturing operations and, in addition, have resulted in a decreased shelf-life of the products due to losses of flavorant by diffusion on storage.

In an attempt to alleviate these problems, it has been suggested that a tobacco flavorant might be adsorbed on a suitable support, such as activated charcoal or fuller's earth, and that the resultant composition might then be added to the tobacco. Attempts to pursue this method have not been satisfactory. The flavorant yields from such adsorbents have been found to be very low. Moreover, this method obviously necessitates incorporation of the adsorbent into the tobacco, and such a foreign material can result in an undesirable appearance as well as give rise to uneven burning of the tobacco.

In order to overcome these difficulties, a flavorant such as menthol has been incorporated into the tobacco as a part of a compound (i.e., a menthol-release agent) in such form that upon burning of the tobacco, the compound is decomposed to yield the desired menthol flavorant. While considerably more satisfactory than earlier attempts, even this technique has evidenced certain drawbacks.

Bavley et al., U.S. Pat. No. 3,312,226, describes a process whereby menthol is incorporated into tobacco as the carbonate ester of various alcohols, particularly one such as linalool, which are themselves useful flavorants. Upon pyrolysis of these carbonate esters, incident to the normal burning temperatures of the tobacco, the menthol is released to flavor the smoke. However, these simple carbonate esters have not proven wholly satisfactory. They retain one of the difficulties of menthol itself, in that they are somewhat susceptible to migration in the tobacco, and thereby prevent the strict control of quantitative release of menthol to the tobacco smoke during burning.

The Mold et al U.S. Pat. Nos. 3,332,428 and 3,419,543, offer a slightly different approach to the problem of adding menthol flavor to a tobacco smoke. These patents, like that of Bavley et al, rely upon the formation of a carbonate ester to bind the menthol in a release agent.

The Rundberg, Jr. et al. U.S. Pat. No. 3,887,603 describes the development of a new type of menthol-release agent for imparting menthol flavor to tobacco smoke with a high efficiency of menthol release upon pyrolysis under normal smoking conditions. The menthol-release agent is a polymeric l-menthyl carbonate ester composition characterized by the presence of a tertiary alcohol ester attachment.

U.S. Pat. Nos. 3,047,431 and 3,047,432 describe clathrate complexes which release flavorants to tobacco products under normal smoking conditions. Clathrate complexes have the disadvantage that they tend to dissociate when dissolved in solvents for the purpose of treating tobacco. Also, a clathrate complex additive tends to be unstable on tobacco due to the moisture in the tobacco, thereby releasing the complexed flavorant.

U.S. Pat. No. 3,047,433 describes Diels-Alder adducts which release flavorants to tobacco under normal smoking conditions. Such Diels-Alder adducts do not release flavorants efficiently, and they tend to produce undesirable side products under smoking conditions.

As it is apparent, the use of the diverse types of tobacco flavorants is characterized by various disadvantages. Some flavorants are prohibitively expensive. Other flavorants are complex mixtures of variable constituency and are inconsistent in effect. Other flavorants are too volatile for cigarette packaging and storage purposes. Still other prior art flavorants have a fragrance which impart undesirable aroma characteristics to tobacco products or which do not adequately improve the taste, character, and flavor of smoking tobacco. As a further disadvantage, conventional tobacco flavorants as described hereinabove either do not enhance the flavor and aroma of sidestream cigarette smoke or they may in fact impart an undesirable harshness to sidestream cigarette smoke.

Accordingly, it is a main object of this invention to provide smoking tobacco compositions having incorporated therein a flavorant which is characterized by lack of mobility and/or volatility at ambient temperature.

It is another object of this invention to provide smoking tobacco compositions having incorporated therein a polymeric composition which is adapted to release flavorant of enhancing character to tobacco smoke under normal smoking conditions, with high efficiency and without masking of the natural flavor of the resultant mainstream tobacco smoke.

It is another object of this invention to provide smoking tobacco compositions having incorporated therein a flavorant-release composition which under normal smoking conditions imparts improved flavor and aroma to sidestream cigarette smoke.

It is a further object of this invention to provide novel carbonate ester resin compositions which are adapted to be incorporated into tobacco compositions, and which under normal smoking conditions release an isoprene, anethole or menthene type of tobacco flavorant.

Other objects and advantages of the present invention shall become apparent from the following description and examples.

DESCRIPTION OF THE INVENTION

One or more objects of the present invention are accomplished by the provision of a tobacco composition which contains a carbonate ester resin composition as a flavorant-release agent, said polymeric composition having a molecular weight in the range between about 500 and 2,000,000 and consisting essentially of recurring monomer units corresponding to the formula:

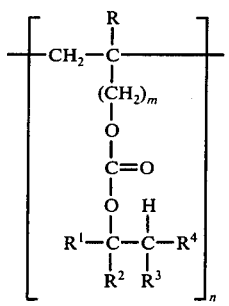

wherein R is a member selected from the group consisting of hydrogen and aliphatic, alicyclic and aromatic hydrocarbon radicals containing between 1 and about 10 carbon atoms, with the proviso that R is hydrogen when m is zero; $R^1$, $R^2$, $R^3$ and $R^4$ are members independently selected from the group consisting of hydrogen and aliphatic, alicyclic and aromatic hydrocarbon radicals, and $R^1$ and $R^3$ when taken together with connecting elements form an alicyclic structure, and wherein the total number of carbon atoms in $R^1$, $R^2$, $R^3$ and $R^4$ collectively does not exceed about 20; m is an integer between about 0 and 8; and n is an integer between 2 and about 10,000.

In the carbonate ester resin formula hereinabove, R is preferably hydrogen or an aliphatic radical containing between 1 and about 6 carbon atoms, such as methyl, ethyl, propyl, isobutyl, pentyl, and the like. Preferred alicyclic R radicals are those containing between about 3 and 10 carbon atoms, such as cyclopropyl, cyclobutyl, cyclopentyl, cyclohexyl, and the like, and alkyl-substituted derivatives thereof. Preferred aromatic R radicals are those containing between 6 and 10 carbon atoms such as phenyl, tolyl, xylyl, and the like, and phenylalkyl radicals such as benzyl, phenylethyl, phenylpropyl, and the like. It is highly preferred that the R radicals are selected from hydrogen and lower alkyl and phenyl substituents.

In the formula represented above, under normal tobacco smoking conditions flavorant is released in accordance with the following illustrated pyrolysis mechanism:

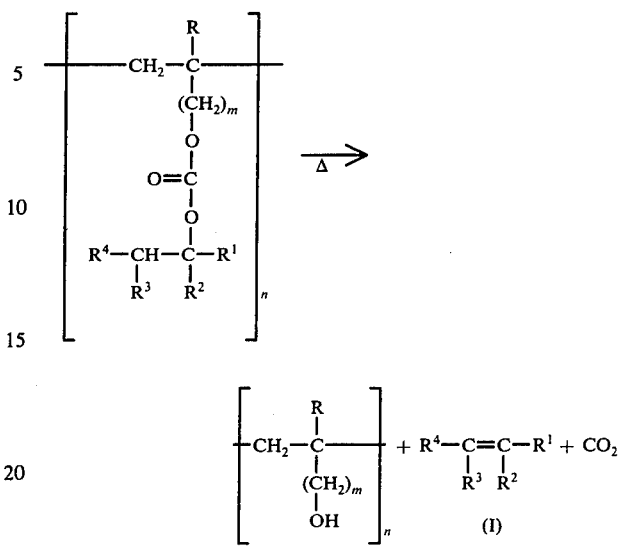

Formula I in accordance with the present invention is a volatile pyrolysis component which functions to improve the flavor and aroma of mainstream and sidestream cigarette smoke. It is preferred that the total number of carbon atoms in the flavorant chemical structure does not exceed about 22 carbon atoms. Illustrative of preferred flavorant compositions are butadiene, pentadiene, isoprene, menthene, anethole, and the like.

As it is apparent, the $R^1$, $R^2$, $R^3$ and $R^4$ radicals described herein can include other elements in addition to hydrogen and carbon, e.g., oxygen and nitrogen. Such elements can be in the structural form of alkoxy, alkyleneoxy, carbonyl, carbalkoxy, epoxy, amino, and the like, and in radical forms of heterocyclic structures such as pyrrole, imidazole, indole, pyridine, pyrazine, piperidine, piperazine, furan, pyran, morpholine, and the like.

The $R^1$, $R^2$, $R^3$ and $R^4$ radicals generally will be individuals selected from hydrogen and lower alkyl and lower alkenyl having between about 1 and about 4 carbon atoms. The same radicals can also be taken collectively so as to form the structural elements of menth-1-yl, and the like. Flavorant compounds having terpenoid structures are desirable since they tend to reinforce the natural taste, character and flavor of cigarette smoke, e.g., isoprene, limonene, and the like.

In the carbonate ester resin formula represented hereinabove, m is a whole integer having a value between 0 and about 8, and preferably a value of 1. n is a whole integer having a value between 2 and about 10,000, and preferably a value between about 5 and 50.

Preparation Of Polymeric Carbonate Ester Compositions

Allylic or vinylic monomers can be provided by the reaction of a suitable chloroformate with a suitable alcohol, either in the presence of a proton acceptor, or by employing the alkali metal salt of the alcohol:

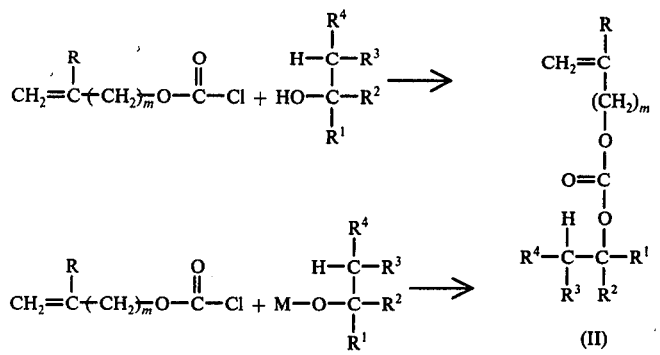

It is also convenient to produce the same unsaturated monomers by reacting the corresponding unsaturated alcohol with the appropriate chloroformate:

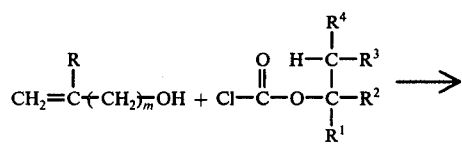

The monomer may be polymerized by a free radical process employing azo-bis-isobutyronitrile, dibenzoyl peroxide, alkyl boron and oxygen or other free-radical initiators, at a temperature in the range between about −80° C and 100° C under an inert atmosphere.

As an alternative method of carbonate ester resin preparation, poly(allyl chloroformate), prepared in accordance with U.S. Pat. No. 2,464,056, or poly(vinyl chloroformate), prepared in accordance with U.S. Pat. No. 2,377,085, can be treated with the alkali metal salt of a suitable alcohol:

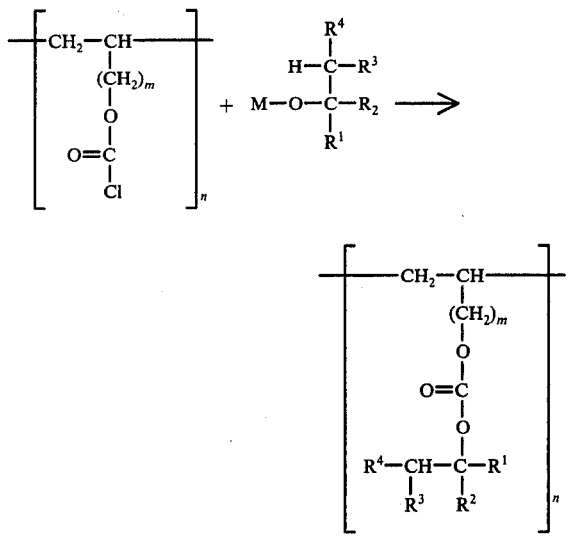

In the chemical structure illustrated, $m$ is 0 or 1, and the metal M can be lithium, sodium, potassium, magnesium, calcium, silver, zinc, mercury, and the like. As an alternative, an acid acceptor may be employed such as pyridine; triethylamine; 1-azatricyclo[2,2,2]octane; 1,4-diazatricyclo[2,2,2]octane, and the like, when the free alcohol (i.e., M is hydrogen) is being reacted.

The flavorant-release carbonate ester resin compositions preferred for incorporation in tobacco compositions are those in which $m$ is 1 and R is hydrogen in the structural formula. If R is hydrogen and $m$ is 0, then in some cases two pyrolysis mechanisms will compete to yield two flavorant moieties, e.g., menthene and menthol.

Novel Flavorant-release Compositions

Several of the flavorant-release carbonate ester resin compositions which correspond to the structural formula set forth hereinabove are known in the prior art. Belgian Pat. No. 610,590 (Nov. 22, 1961) discloses various poly(vinyl carbonate) derivatives. U.S. Pat. No. 2,595,214 discloses a class of polymeric allyl alkyl carbonates which can be employed for the practice of the present invention.

As another embodiment, the present invention provides a class of novel carbonate ester resin compositions which are adapted to be incorporated into tobacco compositions, and which under normal smoking conditions release a highly desirable type of flavorant such as isoprene, anethole, menthene, and the like.

The said novel carbonate ester resin compositions have a molecular weight in the range between about 500 and 2,000,000 and consist essentially of recurring monomer units corresponding to the formula:

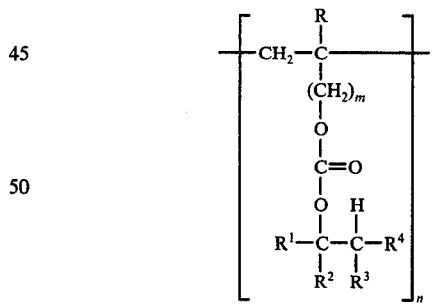

wherein R is a member selected from the group consisting of hydrogen and aliphatic, alicyclic and aromatic hydrocarbon radicals containing between 1 and about 10 carbon atoms, with the priviso that R is hydrogen when $m$ is zero; $R^1$ is a member independently selected from the group consisting of unsaturated aliphatic radicals, and alicyclic and aromatic hydrocarbon radicals; $R^2$, $R^3$ and $R^4$ are members independently selected from the group consisting of hydrogen and aliphatic, alicyclic and aromatic hydrocarbon radicals; $R^1$ and $R^3$ when taken together with connecting elements form an alicyclic structure, and wherein the total number of carbon atoms in $R^1$, $R^2$, $R^3$ and $R^4$ collectively does not exceed about 20; $m$ is an integer between 0 and about 8; and $n$ is an integer between 2 and about 10,000.

Preparation Of Tobacco Compositions

The present invention smoking compositions can be prepared by admixing natural or reconstituted tobacco with between about 0.0005 and 10 weight percent based on the weight of tobacco, of a flavorant-release agent which corresponds to the structural formulae set forth hereinabove in definition of the carbonate ester resin compositions.

The flavorant-release agent can be incorporated into the tobacco in accordance with methods known and used in the art. Preferably the flavorant-release agent is dissolved in a solvent such as acetone or cyclohexane and then sprayed or injected into the tobacco matrix. Such method ensures an even distribution of the flavorant-release agent throughout the tobacco, and thereby facilitates the production of a more uniform smoking tobacco composition. Other methods of incorporating the flavorant-release agents are as suspensions in a liquid medium such as water or alcohol, as chopped fiber following spinning, or as an ingredient in a reconstituted tobacco.

In accordance with this invention, there are substantially no losses of flavorant through sublimation or volatilization thereof during the manufacturing and storage operations incident to the production of a useful smoking composition. Additionally, the drawbacks of diffusion of flavorant, or of a flavorant-release agent, within the tobacco are successfully eliminated, and the control of quality and uniformity within the product tobacco compositions is successfully maintained.

Further, the non-flavorant residue resultant from the pyrolysis, incident to normal smoking, of a present invention smoking tobacco composition is non-deleterious to the flavor of the tobacco smoke. The present invention flavorant-release compositions function to liberate flavorant with optimal efficiency, incident to normal smoking. Also, the flavorants released in accordance with the present invention can impart flavor and aroma to sidestream cigarette smoke. This is a unique characteristic in comparison with prior art tobacco flavorants, and it represents an important advantage of the present invention flavorant-release compositions.

The following examples are further illustrative of the present invention. The reactants and other specific ingredients are presented as being typical, and various modifications can be derived in view of the foregoing disclosure within the scope of the invention. In the examples, vinyl chloroformate and allyl chloroformate are employed as reactants with suitable alcohols so as to provide intermediates which have a chemical structure corresponding to an invention composition having the integer $m$ as 0 or 1. It is readily apparent that $m$ can be 2 or 3, or higher, as derived from the corresponding chloroformate:

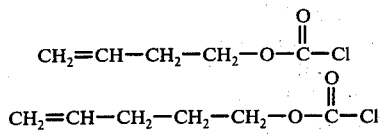

Compositions in which $m$ is more than about 8 are not preferred since a higher molecular weight is not advantageous, and there is a lower weight proportion of flavorant moiety in the compositions as the value of $m$ increases.

In a further embodiment, the present invention also contemplates the incorporation of one of the carbonate resin compositions described above into an article of manufacture which is burned under controlled conditions within the environment of a human habitat. In particular, the combustible articles contemplated are those such as candles, room deodorizers, manufactured fireplace fuel, and the like, the burning of which evolves a gasiform effluent which can be sensed by individuals within olfactory proximity. As it is apparent, wood logs can also be treated with a solution of a carbonate ester resin composition prior to ignition in a fireplace.

The incorporation of between about 0.01 and 10 weight percent of a present invention carbonate ester resin composition into a candle, for example, can introduce a pleasant aroma or fragrance into a confined living space when the candle is lighted.

EXAMPLE I

Preparation of 1-Anisyl-1-Propyl Allyl Carbonate

A 1.7M ethereal solution of methyllithium (Alfa Inorganics) containing 1.0 mole of the reagent was placed in a Grignard flask under nitrogen and cooled with an ice bath. A small amount of 2,2'-bipyridyl was added as an indicator. The mixture was titrated with neat 1-anisyl-1-propanol (158.91 grams, 0.956 mole) over a period of about 4 hours. The highly exothermic reaction reached a maximum of 15° C. The cold contents of the upper vessel were added slowly with stirring under a nitrogen atmosphere to 126.5 grams (1.049 mole) allyl chloroformate in 450 milliliters of freshly distilled tetrahydrofuran in the lower vessel. This vessel was also cooled by means of an ice bath, and the reaction temperature reached a maximum of 10° C during addition.

Stirring was continued overnight, during which time the reaction mixture was allowed to warm slowly to ambient temperature. The reaction mixture was poured into one liter of an aqueous saturated sodium bicarbonate solution. This mixture was extracted successively with several portions of ether. The combined ether extracts were washed with four portions of water and dried over magnesium sulfate. Removal of solvent under reduced pressure left a residue (293.9 grams) which nmr and ir spectra indicated to be 1-anisyl-1-propyl allyl carbonate contaminated with tetrahydrofuran and other impurities.

Passage of this material through a thin film molecular still at 30°–40° C skin temperature and 4.5–1.0 mm pressure gave 263.4 grams of the carbonate as a residue, now free of tetrahydrofuran and other volatile impurities. The material was again passed through the thin film molecular still at 100°–120° C skin temperature and 0.17–0.22 mm pressure. These conditions yielded 164.9 grams of colorless distillate and 74.9 grams of reddish-brown residue, both of which were indicated by spectra to be essentially pure 1-anisyl-1-propyl allyl carbonate.

Redistillation of 10 grams of the colorless distillate through a short-path microware still provided analytically pure 1-anisyl-1-propyl allyl carbonate (bp 107.5° C/0.12 mm).

Distillation of the remainder of the colorless distillate (from the thin-film molecular still) through a total-reflux head produced two fractions (11.4 and 64.2 grams) of polymerization-grade 1-anisyl-1-propyl allyl carbonate, bp 105.5°–115.5°/0.12–0.10 mm and 98°–100°/0.07–0.09 mm. The reddish-brown residual fraction from the molecular distillation was repassed through the thin-film molecular still at 100°–118° skin temperature at 0.10–0.14 mm pressure to produce 63.0 grams of colorless distillate, which was then distilled through the total-reflux head to obtain 65.4 grams of polymerization-grade 1-anisyl-1-propyl allyl carbonate (bp 117.5°–120° C/0.08–0.92 mm). The total yield was 96.3 percent.

Elemental Analysis: Found: C, 67.30; H, 7.32; Calc: C, 67.18; H, 7.25.

EXAMPLE II

Preparation of Poly(1-Anisyl-1-Propyl Allyl Carbonate)

A mixture of 50 grams of 1-anisyl-1-propyl allyl carbonate and 5 grams of benzoyl peroxide was degassed for 20 minutes by means of a stream of nitrogen in a dried reaction apparatus. The degassing stream was then replaced with a nitrogen atmosphere, and the mixture was heated at 80° C for 24 hours. The mixture gradually became viscous.

The mixture was cooled and dissolved in 100 milliliters of acetone. To this solution was added with stirring 120 milliliters of isopropanol. The entire mixture was then added drop-wise to 2.6 liters of methanol cooled by means of a dry ice-isopropyl alcohol bath. The polymer separated as a colorless precipitate and was removed by vacuum filtration. As it warmed to ambient temperature, the polymer agglomerated to a tacky mass, and was reprecipitated twice more by the same process. Drying of the polymeric mass under vacuum (0.04 mm) at ambient temperature for 72 hours resulted in a friable, rigid foam which on grinding yielded 35.3 grams (70.5%) of poly (1-anisyl-1-propyl allyl carbonate) as a fine, colorless powder.

Other samples, obtained by similar treatment, were submitted for elemental analysis, molecular weight determination, and spectral data. Osmometry indicated the molecular weight as 5160 and 5144.

Elemental Analysis: Found: C, 67.12; H, 7.16; Calc: C, 68.18; H, 7.20.

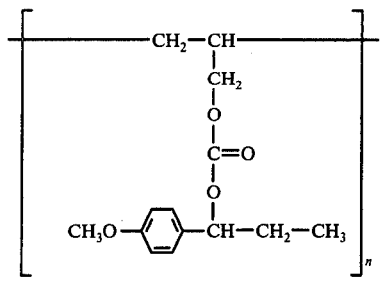

EXAMPLE III

Preparation of Vinyl 3-Methylbut-1-en-3-yl Carbonate

3-Methylbut-1-en-3-ol (51.6 grams, 0.599 mole) in dry THF (575 milliliters) was converted to the lithium salt by the addition of methyllithium (220 milliliters of 1.82 M ethereal solution, 0.401 mole) at −75° C. This solution was then added to vinyl chloroformate (50.4 grams, 0.473 mole) in 150 milliliters of dry THF at −75° C. The reaction mixture was stirred for 0.5 hour and then allowed to warm to ambient temperature.

The reacton mixture was poured into one liter of half-saturated aqueous sodium bicarbonate solution. This solution was extracted with several portions of ether. The combined ether extracts were washed with water and then dried over magnesium sulfate. Solvent was removed under reduced pressure. Distillation pf the residue yielded vinyl 3-methylbut-1-en-3-yl carbonate (42.7 grams, 68.2% yield, bp 53°–54°/11 mm).

The infrared and Raman spectra showed a carbonyl band at 1763 cm$^{-1}$, indicative of a vinyl carbonate.

Elemental Analysis: Found: C, 61.72; H, 7.82; Calc: C, 61.52; H, 7.75.

EXAMPLE IV

Preparation of Poly(Vinyl 3-Methylbut-1-en-3-yl Carbonate)

Method A

Vinyl 3-methylbut-1-en-3-yl carbonate (10.06 grams) was placed in a flask with benzoyl peroxide (0.31 gram). After appropriate degassing, the mixture was heated at 60° C for 24 hours with stirring to produce poly(vinyl 3-methylbut-1-en-3-yl carbonate) (9.87 grams).

Method B n-Butyllithium (10 milliliters, 2.0 M in n-hexane) was added slowly to 3-methylbut-1-en-3-ol (2.58 grams, 0.03 mole) in 75 milliliters of dry THF at 5° C in a nitrogen atmosphere. The mixture was stirred for 10 minutes at 5° C, and then added to 1.90 grams (0.018 mole) of poly(vinyl chloroformate) in 150 milliliters of dry THF at 5° C. The mixture was allowed to warm to ambient temperature and was stirred for 20 minutes. Water (100 milliliters) was then added, followed by one liter of methanol. The precipitated polymer was removed and dried. After drying, the polymer weighed 2.14 grams.

EXAMPLE V

Preparation of Poly(Allyl 3-Methylbut-1-en-3-yl Carbonate)

Methyllithium (45 milliliters, 2.0 M in ether) was added to 3-methylbut-1-en-3-ol (7.75 grams, 0.09 mole) while maintaining the temperature below 30° C. After 30 minutes, the reaction mixture showed a positive Michler's ketone test so four 100-μl portions of neat 3-methylbut-1-en-3-ol were added with 10 minute intervals between additions. After the last addition, the reaction mixture gave a negative Michler's ketone test. The reacton mixture was then added slowly to poly(allyl chloroformate) (9.64 grams, 0.08 mole) in 200 milliliters dry THF at or below 27° C. Stirring at ambient temperature was continued for 48 hours. The reaction mixture was concentrated to 70 milliliters, and dissolved in 400 milliliters of dichloromethane. This solution was washed successively with portions of water, 2% hydrochloric acid solution, half-saturated aqueous sodium bicarbonate solution, and finally with portions of water again. The dried dicholormethane solution was then concentrated to 100 milliliters and added to 500 milliliters of methanol. The precipitated polymer was removed, dissolved in 15 milliliters of acetone and reprecipitated in methanol. After drying under vacuum, 7.14 grams of poly(allyl 3-methybut-1-en-3-yl carbonate) were obtained.

The material showed infrared absorption bands at 1750 and 1260 cm$^{-1}$. The Raman spectrum showed bands at 1735, 1645, and 1300 cm$^{-1}$.

Elemental Analysis: Found: C, 63.67; H, 8.63; Calc: C, 63.51; H, 8.29.

EXAMPLE VI

Preparation Of A Smoking Composition

Tobacco was sprayed with an acetone solution of poly(1-anisyl-1-propyl allyl carbonate) and 85 mm cigarettes containing conventional cellulose acetate filters (21 mm length) and containing 0.78 gram of the sprayed tobacco were made by machine. After equilibration at 75° F and 60% relative humidity, the cigarettes were smoked by machine using 35 milliliter puffs of 2-seconds duration followed by 58 seconds of static burn. The cigarettes were smoked to a butt length of 28 mm, consuming 57 mm of the 64 mm section of tobacco. Mainstream and sidestream smoke were trapped and analyzed for anethole. The results were as follows:

| | | | Anethole Delivery to Mainstream and Sidestream Smoke From Poly (1-Anisyl-1-Propyl Allyl Carbonate) and From Free Anethole on Cigarettes | | |
|---|---|---|---|---|---|
| | | | Anethole Delivered | | |
| Cigarette | Weight Polymer (μcigt) cigt) | Weight Of Free Anethole (μ/ cigt) | M.S. Smoke (μg cigt) | S.S. Smoke (μg/ cigt) | Total (μg/ cigt) |
| A | 780 | — | 5.9 | 118 | 124 |
| B | 1560 | — | 11.5 | 289 | 301 |
| C | 3900 | — | 23.5 | 605 | 629 |
| D | 7800 | — | 60.0 | 1450 | 1510 |
| E | — | 780 | 52 | 422.5 | 474.5 |
| F | 7800 | — | 88 | 1500 | 1588 |
| G | — | 780 | 65 | 301 | 366 |

EXAMPLE VII

Preparation Of A Smoking Composition

Poly(allyl 3-methylbut-1-en-3-yl carbonate) (0.26 gram) was mixed with tetrahydrofuran (10 milliliters) and sprayed onto 30 grams of expanded stems. Handmade cigarettes containing approximately 600 mgs of stems per cigarette were prepared, conditioned, and were smoked according to the method of Example VI. The smoke from the cigarettes was analyzed by infrared spectroscopy for isoprene. The results were as follows:

| Isoprene Delivery From Expanded Stem Cigarettes Treated With Poly(Allyl 3-Methylbut-1-en-3-yl Carbonate | |
|---|---|
| Cigarette | Isopropene/ cigt in μg |
| Control, Expanded Stems | 91 |
| Experimental, Polymer on Expanded Stems | 182 |
| Commercial Cigarette | 589 |

Subjective evaluation showed that application of the polymer improved the taste of smoke from the expanded stems.

EXAMPLE VIII

Pyrolysis Of Poly(Vinyl 3-Methylbut-1-en-3-yl Carbonate)

Samples weighing approximately 2 mg each of poly(-vinyl 3-methylbut-1-en-3-yl carbonate), prepared by the method described in Example IV-A, were pyrolyzed in a stream of helium. The pyrolysis was carried out in a quartz tube heated by an electric furnace. The pyrolysate was carried by the helium sweep into a trapping and gas chromatographic analysis system. The results were as follows:

| Pyrolysis Products of Poly(Vinyl 3-Methylbut-1-en-3-yl Carbonate) | | | | | |
|---|---|---|---|---|---|
| | | Carbon Dioxide | | Isoprene | |
| Temp. (° C) | Weight Of Sample (μg) | Wt. (μg) | Percent Of Theoretical | Wt (μg) | Percent Of Theoretical |
| 150 | 1997 | 65 | 11.5 | 64 | 7.4 |
| 200 | 2038 | 321 | 55.8 | 361 | 40.6 |
| 300 | 1973 | 495 | 89.0 | 437 | 50.8 |
| 400 | 2026 | 554 | 97.0 | 467 | 52.9 |
| 500 | 1963 | 496 | 89.6 | 440 | 51.4 |
| 600 | 2044 | 644 | 111.7 | 416 | 46.7 |
| 700 | 1948 | 517 | 94.1 | 142 | 16.7 |

EXAMPLE IX

Pyrolysis Of Poly(Vinyl 3-Methylbut-1-en-3-yl Carbonate)

Samples weighing approximately 2 mg each of poly(-vinyl 3-methylbut-1-en-3-yl carbonate), prepared by the method described in Example IV-B, were pyrolyzed by the method described in Example VIII. The results were as follows:

| Pyrolysis of Poly(Vinyl 3-Methylbut-1-en-3-yl Carbonate) | | | | | |
|---|---|---|---|---|---|
| | | Carbon Dioxide | | Isoprene | |
| Temp (° C) | Sample Wt (μg) | Wt (μg) | Percent Of Theoretical | Wt (μg) | Percent Of Theoretical |
| 200 | 2073 | 356 | 60.1 | 450 | 49.8 |
| 250 | 2071 | 476 | 81.6 | 474 | 52.5 |
| 350 | 2058 | 473 | 81.6 | 465 | 51.8 |
| 450 | 2025 | 458 | 80.3 | 458 | 51.9 |
| 550 | 1984 | 486 | 81.6 | 461 | 53.3 |

EXAMPLE X

Preparation Of Vinyl Menthyl Carbonate

Potassium (2.30 grams, 0.0588 mole) was added to a solution of 9.49 grams (0.0605 mole) of menthol in 100 milliliters of 1,2-dimethoxyethane. The reaction mixture was heated to 70° C and stirred overnight. The cooled reaction mixture was then added slowly to 6.37 grams (0.0598 mole) of vinyl chloroformate in 28 milliliters of 1,2-dimethoxyethane cooled in an ice water bath. The temperature was held below 15° C during addition.

The reaction mixture was poured into 250 milliliters of water. The mixture was then extracted with 50 milliliters and 100 milliliter portions of ether. The combined ether extracts were washed with two portions of water, and dried over magnesium sulfate. Removal of solvent under reduced pressure yielded 11.30 grams of a liquid, which crystallized on cooling. This material was triturated three times with methanol. The methanol solutions were combined, and removal of methanol under reduced pressure provided 5.53 grams (37.8% yield) of an oil, which was identified by ir and nmr spectra as vinyl menthyl carbonate.

EXAMPLE XI

Preparation Of Poly(Vinyl Menthyl Carbonate)

Method A

A mixture of 2.0 grams of vinyl menthyl carbonate and 61 milligrams of benzoyl peroxide was degassed with a stream of nitrogen. The mixture was then heated under a nitrogen atmosphere at 70° C for 24 hours. The cooled mixture was then dissolved in 3 milliliters of acetone, and the solution was added slowly to 25 milliliters of rapidly stirred methanol. The resulting fine white precipitate was removed by filtration, washed with two portions of methanol, and dried under reduced pressure. This procedure yielded 0.66 gram (33% yield of poly(vinyl menthyl carbonate) as a fine white powder.

Method B

A solution of 1.72 grams (0.011 mole) of menthol in 50 milliliters of freshly distilled 1,2-dimethoxyethane under a nitrogen atmosphere at 60° C was treated with 0.39 gram (0.10 mole) of potassium. The entire reaction mixture was added in small portions to a solution of 1.0 gram (0.0094 mole) of poly(vinyl chloroformate) [J. R. Schaefgen, (a) *J. Polym. Sci., Part C.,* No. 24, 75–88 (1967); (b) *Amer. Chem. Soc., Div. Polym. Chem., Reprints,* 8 723 (1967)] in 50 milliliters of freshly distilled 1,2-dimethoxyethane maintained below −15° C during the addition. After the addition was completed, the mixture was stirred for 2 hours at −20° C, 1 hour at 10° C, and 2 hours at 40° C. When the reaction mixture was poured into water and extracted with ether, an intractable emulsion resulted. Consequently, the ether and the water were removed under reduced pressure. The moist solids were triturated with ether, and the ether solutions were dried over magnesium sulfate.

The solution was concentrated under vacuum, and a portion was added to methanol. This produced a white precipitate, which after filtration and drying under vacuum weighed 250 mg. The precipitate was identified by nmr and ir spectra as poly(vinyl menthyl carbonate). The remainder of the ether solution was diluted with acetone and added slowly to methanol causing a tacky precipitate to separate. The mixture was cooled with dry ice, and was stirred for 15 minutes. Filtration then removed a coarse-grained precipitate which, after drying under vacuum, weighed 0.53 grams. The total yield of poly(vinyl menthyl carbonate) was 0.78 grams (31.9%).

EXAMPLE XII

Preparation Of Allyl Menthyl Carbonate

Menthol (15.63 grams, 0.10 mole) in 200 milliliters of freshly distilled tetrahydrofuran cooled to −6° C was titrated with 1.0 M n-butyllithium in ether using 2,2'-bipyridyl as an indicator. During the titration the reaction temperature rose to 18° C. The solution was cooled to −6° C, and then was added over a period of 30 minutes to 13 grams (0.108 mole) of allyl chloroformate in 200 milliliters of tetrahydrofuran which was maintained at −65° C. Stirring was continued for 18 hours during which time the reaction mixture was allowed to warm slowly to ambient temperature.

The reaction mixture was then poured into 750 milliliters of half-saturated sodium bicarbonate solution. The resulting mixture was extracted with three portions of ether. The combined ether extracts were washed with three portions of water. The ether layer was dried over magnesium sulfate. Removal of solvent under reduced pressure yielded 25.4 grams of a yellow oil which was distilled under vacuum.

| Fraction | B.P. (° C) | P (mm) | Weight (g) |
|---|---|---|---|
| 1 | 21.5° –22.0° | 0.30–0.20 | — |
| 2 | 27° –69° | 0.18–0.13 | 0.75 |
| 3 | 70° –74' | 0.13–0.10 | 18.9 |

This material was identified by infrared and nmr spectra, and by elemental analysis as allyl menthyl carbonate. The infrared spectrum showed bands at 1766 (C=O), 1388 and 1372 doublet (CH$_3$), and 1652 cm$^{-1}$(CH$_2$=CH).

Elemental Analysis: Found: C, 69.76; H, 9.82; Calc: C, 69.96; H, 10.06.

EXAMPLE XIII

Preparation Of Poly(Allyl Menthyl Carbonate)

Allyl menthyl carbonate (5.00 grams) and benzoyl peroxide (0.2085 grams) were degassed with nitrogen. The mixture was then heated to 70° C and was stirred under nitrogen atmosphere for 72 hours. The cooled reaction mixture was then dissolved in 75 milliliters of acetone. Subsequently, 75 milliliters of 2-propanol was added, and the entire solution was added slowly to 300 milliliters of methanol with rapid stirring. A tacky precipitate was collected, and re-precipitated by the same process.

This produced a fine, granular, white precipitate which was collected by vacuum filtration. Drying under vacuum gave 2.05 grams (41.0%) of poly(allyl menthyl carbonate). Poly(allyl menthyl carbonate) was identified by ir and nmr spectra, and by elemental analysis. The infrared spectrum showed bands at 3020 and 2990 (=C—H), 1745 (C=O), 1650 (C=C), 1390 and 1373 (geminal CH$_3$), and 1255 cm$^{-1}$ (C—O).

Elemental Analysis: Found: C, 69.87; H, 9.96; Calc: C, 69.96; H, 10.06.

EXAMPLE XIV

Pyrolysis Of Poly(Vinyl Menthyl Carbonate)

Samples of poly(vinyl menthyl carbonate), prepared by the procedure described in Example XI-A, and weighing approximately 1 mg each, were pyrolyzed by the procedure described in Example VIII. The results were as follows:

| Menthene Delivery From Poly(Vinyl Menthyl Carbonate) | | | |
|---|---|---|---|
| Temp (° C) | Weight Polymer (μg) | Weight Menthene (μg) | Percent of Theoretical Menthene Delivered |
| 250 | 971 | 75.3 | 5.9 |
| 310 | 1052 | 188 | 29.2 |
| 350 | 985 | 235 | 39.0 |
| 450 | 985 | 270 | 49.9 |
| 550 | 1240 | 303 | 39.9 |

EXAMPLE XV

Pyrolysis Of Poly(Allyl Menthyl Carbonate)

Samples of poly(allyl menthyl carbonate), prepared by the procedure described in Example XIII, and weighing approximately 1 mg each, were pyrolyzed by the procedure described in Example VIII. The results were as follows:

| Menthene Delivery From Poly(Allyl Menthyl Carbonate) | | | |
|---|---|---|---|
| Temp (° C) | Weight* Polymer (μg) | Weight* Menthene (μg) | Percent of Theoretical* Menthene Delivered |
| 250 | 1016 | 27.8 | 4.7 |
| 350 | 1064 | 476 | 77.7 |
| 450 | 995 | 505 | 88.1 |
| 550 | 1036 | 284 | 47.6 |

*Values are averages from multiple determinations.

EXAMPLE XVI

Preparation Of 2,3-Dimethylbut-2-yl Allyl Carbonate

To a solution of 10.22 grams (0.10 mole) of 2,3-dimethylbutan-2-ol in 75 milliliters of anhydrous tetrahydrofuran at 0° C was added one equivalent of methyllithium in diethyl ether, followed by 12.1 grams (0.10 mole) of allyl chloroformate in 25 milliliters of anhydrous tetrahydrofuran. During both additions the temperature was maintained at 0° C. After the last addition was complete the reaction mixture was stirred for about 18 hours and allowed to warm to ambient temperature. The reaction mixture was poured into water, and then extracted with ether. The ether solution was washed four times with water and dried over magnesium sulfate. Removal of solvent under reduced pressure yielded 16.45 grams (88.4% crude yield) of a light yellow oil. Distillation under vacuum provided three fractions.

| Fraction | b.p. (° C) | P (mm) | Wt. (g.) |
|---|---|---|---|
| 1 | 23–52° | 0.12 | 3.00 |
| 2 | 52–57° | 0.12 | 5.76 |
| 3 | 57–58° | 0.12 | 1.53 |

EXAMPLE XVII

Preparation Of 2,3-Dimethylpent-3-yl Allyl Carbonate

To a solution of 11.62 grams (0.1 mole) of 2,3-dimethylpentan-3-ol in 75 milliliters of anhydrous tetrahydrofuran at 0° C was added one equivalent of methyllithium in diethyl ether, followed by 12.1 grams (0.10 mole) of allyl chloroformate in 25 milliliters of anhydrous tetrahydrofuran. During both additions the temperature was maintained at 0° C. After the last addition was complete the reaction mixture was stirred for about 18 hours and allowed to warm to ambient temperature. The reaction mixture was poured into water, and then extracted with ether. The ether solution was washed four times with water and dried over magnesium sulfate. Removal of solvent under reduced pressure yielded 18.27 grams (93.1% crude yield) of a yellow oil. Vacuum distillation gave 10.79 grams of 2,3-dimethylpent-3-yl allyl carbonate, b.p. 59°–60° C/0.15 mm.

EXAMPLE XVIII

Preparation Of Methallyl Chloroformate

Employing the procedure of Oliver and Young [J. Am. Chem. Soc., 81, 5811 (1959)], phosgene (135.6 grams, 1.37 mole) was condensed into 21.63 grams (0.36 mole) of methallyl alcohol in 250 milliliters of diethyl ether at about −70° C with stirring. The mixture was stirred with cooling for 2 hours, and then stirred without cooling for about 18 hours. Excess phosgene was removed by bubbling a stream of nitrogen through the solution for 4 hours. The remaining solvent was removed under reduced pressure at ambient temperature, yielding a light yellow residue weighing 38.98 grams (80.4%). The n.m.r. spectrum indicated this material to be methallyl chloroformate.

EXAMPLE XIX

Preparation Of 2,3-Dimethylbut-2-yl Methallyl Carbonate

To a solution of 12.26 grams (0.12 mole) of 2,3-dimethylbutan-2-ol in 75 milliliters of anhydrous tetrahydrofuran at 0° C under a nitrogen atmosphere was added one equivalent of methyllithium in ether solution. Then 19.31 grams (0.14 mole) of methallyl chloroformate in 25 milliliters of anhydrous tetrahydrofuran was added. During additions the temperature was maintained at 0° C. Cooling was discontinued and the reaction mixture was stirred for about 18 hours. The reaction mixture was poured into water, and then extracted with ether. The ether layer was separated and washed with water, and then dried over magnesium sulfate. Removal of solvent under reduced pressure yielded 21.42 grams (89.1%) of a straw colored liquid. A pure sample of 2,3-dimethylbut-2-yl methallyl carbonate was obtained by vacuum distillation (Fraction 2).

| Fraction | b.p. (° C) | P (mm) | Wt. (g.) |
|---|---|---|---|
| 1 | 44–58° | 0.09 | 1.73 |
| 2 | 58° | 0.09 | 12.48 |
| 3 | 58–66° | 0.09 | 2.57 |

EXAMPLE XX

Preparation Of 2,3-Dimethylpent-3-yl Methallyl Carbonate

To a solution of 13.94 grams (0.12 mole) of 2,3-dimethylpentan-3-ol in 75 milliliters of anhydrous tetrahydrofuran at 0° C under a nitrogen atmosphere was added with stirring one equivalent of methyllithium in diethyl ether. Then 19.31 grams (0.14 mole) of methallyl chloroformate in 25 milliliters of anhydrous tetrahydrofuran was added. During additions the temperature was maintained at 0° C. Cooling was discontinued and the reaction mixture was stirred for about 18 hours. The reaction mixture was poured into water, and then extracted with ether. The ether layer was separated and washed with water, and then dried over magnesium sulfate. Removal of solvent under reduced pressure yielded 24.32 grams (94.6%) of a yellow oil. A pure sample was obtained by vacuum distillation (Fraction 2).

| Fraction | b.p. (° C) | P (mm) | Wt. (g.) |
|---|---|---|---|
| 1 | 42–63° | 0.075 | 0.37 |
| 2 | 63–66° | 0.075 | 16.77 |

EXAMPLE XXI

Poly(2,3-Dimethylbut-2-yl Allyl Carbonate)

A mixture of 3.00 grams of 2,3-dimethylbut-2-yl allyl carbonate and 100 mg. of benzoyl peroxide was degassed by means of a stream of nitrogen for 1 hour, and then heated at 75° C with stirring for 72 hours. The cooled reaction mixture was dissolved in 10 milliliters of methylene chloride. Addition of this solution to methanol with rapid stirring produced a tacky solid precipitate. This material was twice more precipitated by the same procedure, and then dried at ambient temperature and 0.05 mm pressure for 48 hours. This produced poly(2,3-dimethylbut-2-yl allyl carbonate) as a rigid white foam, which was ground to a white powder weighing 1.05 grams (35.0%).

EXAMPLE XXII

Poly(2,3-Dimethylpent-3-yl Allyl Carbonate)

A mixture of 3.00 grams of 2,3-dimethylpent-3-yl allyl carbonate and 100 mg. of benzoyl peroxide was degassed for 1 hour by means of a stream of nitrogen, and then heated at 75° C with stirring for 72 hours. The cooled reaction mixture was dissolved in 10 milliliters of methylene chloride and the resulting solution was added slowly to methanol with rapid stirring. This produced a tacky precipitate. The material was reprecipitated twice more using the same procedure, and then dried at ambient temperature and 0.05 mm pressure for 48 hours. This yielded 1.10 grams (36.7%) of poly(2,3-dimethylpent-3-yl allyl carbonate) as a rigid foam, which was ground to a colorless powder.

EXAMPLE XXIII

Poly(2,3-Dimethylbut-2-yl Methallyl Carbonate)

A mixture of 3.05 grams of 2,3-dimethylbut-2-yl methallyl carbonate and 105 mg. of benzoyl peroxide was degassed for 1 hour by means of a stream of nitrogen, and then heated at 75° C for 72 hours with stirring under a nitrogen atmosphere. The cooled reaction mixture was dissolved in methylene chloride, and the resulting solution was added slowly to methanol with vigorous stirring. A colorless precipitate formed, and was twice reprecipitated by the same procedure. Drying the tacky mass at ambient temperature and 0.05 mm pressure for 48 hours yielded 0.69 gram (23%) of poly(2,3-dimethylbut-2-yl methallyl carbonate) as colorless foam, which was ground to a fine powder.

EXAMPLE XXIV

Poly(2,3-Dimethylpent-3-yl Methallyl Carbonate)

A mixture of 3.12 grams of 2,3-dimethylpent-3-yl methallyl carbonate and 104 mg. of benzoyl peroxide was degassed by means of a stream of nitrogen for 1 hour. The mixture was then heated at 75° C for 72 hours with stirring under a nitrogen atmosphere. The cooled reaction mixture was dissolved in methylene chloride, and the resulting solution was added slowly to methanol with rapid stirring. A colorless precipitate formed, and this material was collected and reprecipitated twice more by the same procedure. Drying of the tacky mass at ambient temperature at 0.05 mm pressure for 48 hours yielded 2.62 grams (87.3%) of poly(2,3-dimethylpent-3-yl methallyl carbonate) as a colorless foam, which was ground to a fine powder.

When the carbonate ester resin compositions prepared in accordance with EXAMPLES XXI–XXIV are pyrolyzed by the procedure described in EXAMPLE VIII, delivery of the expected olefinically unsaturated flavorant is obtained.

Similar results are achieved when a present invention flavorant-release carbonate ester resin composition is pyrolyzed as a constituent of a burning candle.

EXAMPLE XXV

Preparation Of Smoking Compositions

Poly(1-anisyl-1-propyl allyl carbonate) was dissolved in acetone, and portions of the solution were injected via a micro syringe into test cigarettes. Two types of cigarettes were used: (a) a regular filtered cigarette delivering 17.9 mg of FTC "tar" per cigarette, and (b) a low-delivery filtered cigarette giving 2 mg of FTC "tar" per cigarette. Each type of cigarette was injected with sufficient solution to place 5 p.p.m., 50 p.p.m., and 100 p.p.m. of polymer in the filler. These cigarettes were then smoked by expert smokers and compared to control cigarettes lacking the polymer. Their findings are summarized in the table below.

| Subjective Response To The Taste Of Cigarette Smoke of Poly(1-Anisyl-1-Propyl Allyl Carbonate) In Cigarette Filler | | |
|---|---|---|
| Polymer Level/ Cigarette | Regular (17.9 mg) | Low Delivery (2 mg) |
| 5 ppm | Adds some sweetness slightly harsher, and more body | Adds a little sweetness |
| 50 ppm | Adds sweetness and smoothing effect | Adds sweetness |
| 100 ppm | Smoothing, adds sweetness, and slight anethole aftertaste | Adds sweetness, reduces "gas phase" character, and reduces dryness |

What is claimed is:

1. A smoking composition comprising an admixture of natural or reconstituted tobacco and between about 0.0005 and 10 weight percent, based on the weight of tobacco, of a polymeric carbonate ester composition having a molecular weight in the range between about 500 and 2,000,000 and consisting essentially of recurring monomer units corresponding to the formula:

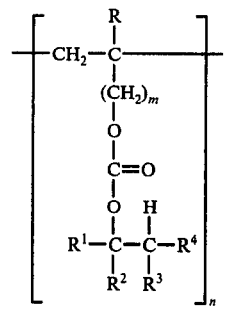

wherein R is a member selected from the group consisting of hydrogen and aliphatic, alicyclic and aromatic hydrocarbon radicals containing between 1 and about 10 carbon atoms, with the proviso that R is hydrogen when m is zero; $R^1$, $R^2$, $R^3$ and $R^4$ are members independently selected from the group consisting of hydrogen and aliphatic, alicyclic and aromatic hydrocarbon radicals, and $R^1$ and $R^3$ when taken together with connecting elements form an alicyclic structure, and wherein the total number of carbon atoms in $R^1$, $R^2$, $R^3$ and $R^4$ collectively does not exceed about 20; m is an integer between 0 and about 8; and n is an integer between 2 and about 10,000.

2. A smoking composition in accordance with claim 1 wherein m is 1 in the carbonate ester formula.

3. A smoking composition in accordance with claim 1 wherein n is an integer between about 5 and 50 in the carbonate ester formula.

4. A smoking composition in accordance with claim 1 wherein each of $R^1$, $R^2$, $R^3$ and $R^4$ is hydrogen in the carbonate ester formula.

5. A smoking composition in accordance with claim 1 wherein $R^1$ is anisyl, $R^2$ and $R^3$ are each hydrogen, and $R^4$ is methyl in the carbonate ester formula.

6. A smoking composition in accordance with claim 1 wherein $R^1$ is vinyl, $R^2$ is methyl, and $R^3$ and $R^4$ are each hydrogen in the carbonate ester formula.

7. A smoking composition in accordance with claim 1 wherein $R^1$, $R^2$, $R^3$ and $R^4$ taken collectively with connecting elements form the menth-1-yl radical in the carbonate ester formula.

8. A method of improving the aroma imparted by the burning of a combustible article of manufacture within the environment of a human habitat, which method comprises incorporating into said article of manufacture prior to its combustion between about 0.01 and 10 weight percent, based on the weight of combustible content, of a polymeric carbonate ester resin composition having a molecular weight in the range between about 500 and 2,000,000 and consisting essentially of recurring monomer units corresponding to the formula:

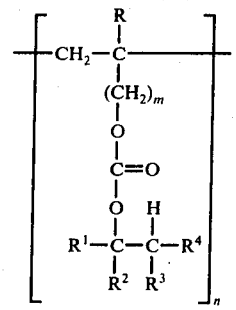

wherein R is a member selected from the group consisting of hydrogen and aliphatic, alicyclic and aromatic hydrocarbon radicals containing between 1 and about 10 carbon atoms, with the proviso that R is hydrogen when m is zero; $R^1$, $R^2$, $R^3$ and $R^4$ are members independently selected from the group consisting of hydrogen and aliphatic, alicyclic and aromatic hydrocarbon radicals, and $R^1$ and $R^3$ when taken together with connecting elements form an alicyclic structure, and wherein the total number of carbon atoms in $R^1$, $R^2$, $R^3$ and $R^4$ collectively does not exceed about 20; m is an integer between 0 and about 8; and n is an integer between 2 and about 10,000.

* * * * *